United States Patent [19]
Farber et al.

[11] Patent Number: 6,016,213
[45] Date of Patent: Jan. 18, 2000

[54] METHOD AND APPARATUS FOR OPTICAL AMPLIFIER GAIN AND NOISE FIGURE MEASUREMENT

[75] Inventors: Gennady Farber, Palo Alto; Salim Jabr, Mountain View, both of Calif.

[73] Assignee: Ditech Corporation, Mountain View, Calif.

[21] Appl. No.: 08/676,561

[22] Filed: Jul. 8, 1996

[51] Int. Cl.$^7$ ................................................ H04B 10/02
[52] U.S. Cl. ...................... 359/177; 359/337; 359/341
[58] Field of Search .................................. 359/177, 337, 359/341; 372/6, 71

[56] References Cited

U.S. PATENT DOCUMENTS

| | | | |
|---|---|---|---|
| 5,138,483 | 8/1992 | Grasso et al. | 359/341 |
| 5,335,109 | 8/1994 | Heidemann | 359/177 |
| 5,430,572 | 7/1995 | DiGiovanni et al. | 359/341 |
| 5,479,423 | 12/1995 | Tanikawa | 359/341 |
| 5,521,751 | 5/1996 | Aida et al. | 359/341 |
| 5,574,534 | 11/1996 | Nogiwa et al. | 359/337 |
| 5,677,781 | 10/1997 | Mori et al. | 359/177 |
| 5,696,707 | 12/1997 | Hentschel et al. | 359/341 |
| 5,781,322 | 7/1998 | Uchiyama et al. | 359/337 |

OTHER PUBLICATIONS

J. Stipple, D Bailey : EDFA testing—Getting the most from your test equipment, in digest of 1995 Hewlett Packard US Lightwave Symposium, pp. 60–75.

I. Habbab, L.J. Cimini, "Optimized Performance of Erbium Doped Fiber Amplifiers in Subcarrier Multiplexed Lightwave AM–VSB Systems", Journal of Lightwave Technology, 9, pp. 1321–1329, (1991).

A. Yariv, "Optical Electronics", Saunders College pubs., (1991).

Primary Examiner—Jeffery A. Hofsass
Assistant Examiner—John Tweel, Jr.
Attorney, Agent, or Firm—Flehr Hohbach test Albritton & Herbert LLP

[57] ABSTRACT

An improved method of measurement of noise figure and gain of optical amplifiers is based on transforming the amplifier into an oscillator by applying optical feedback with known loss. The feedback consists of a tunable filter for wavelength control and of a variable attenuator for gain control. Measuring the output power at a given wavelength and the noise characteristics of the output signal, either with an optical spectrum analyzer or with a set of tunable filters and a power meter, provides data for full characterization of the optical amplifier. Another method is disclosed that utilizes the self-heterodyne setup and electrical spectrum analyzer to measure the spectral line width of the lasing amplifier, from which the noise figure is derived.

13 Claims, 6 Drawing Sheets

METHOD AND APPARATUS FOR OPTICAL AMPLIFIER GAIN AND NOISE FIGURE MEASUREMENT

FIELD OF THE INVENTION

This invention relates to optical amplifiers as used in fiber transmission links, telecommunication and video distribution systems. More specifically it describes a method and apparatus for testing the noise and gain of optical amplifiers.

BACKGROUND OF THE INVENTION

The implementation of fiber transmission links in telecommunications and video distribution systems was significantly advanced by the usage of optical amplifiers instead of traditional regenerative systems. The optical amplifier is a solid state device utilizing a semi-conductor pump laser and a section of active fiber. The active fiber is doped by rare earth ions. The interaction of pump light and active fiber creates active media that amplifies the light. Depending on the type of doping the optical amplifiers can operate in the 1300 nm or the 1550 nm wavelength range.

Optical amplifiers are used as post-amplifiers to boost the power of transmitters, as in-line amplifiers in long distance systems of cascaded amplifiers and as pre-amplifiers at the end of the transmission link. U.S. Pat. No. 5,430,572 teaches the construction of an optical amplifier. In any application mentioned the optical amplifiers are characterized by Gain or output power and Noise Figure (NF) over the wavelength range and the input power range. The Gain of the amplifier is the ratio of output power to input power. The Noise Figure is the characteristic of an amplifier's internal noise which is added to overall noise of the transmission system. The internal optical amplifier noise is caused by Amplified Spontaneous Emission (ASE) occurring in the doped fiber. ASE is the phenomenon wherein pumped ions in the active fiber spontaneously decay, generating light with power within the amplifier bandwidth that is detectable at the amplifier's output. ASE occurs regardless of the presence of an input signal at the amplifier's input. However, because active fiber is homogeneously broadened, i.e. all the rare earth ions dispersed in the fiber interact with the signal light, the power distribution of the ASE varies based on whether the active fiber's input signal is high or low. This is because, when emissions from the active fiber are being stimulated by a high input signal, there are few excited ions and, as a result, the power distribution of the ASE is at a low level. In contrast, when the input signal is low and there is no stimulated emission from the active fiber, there is a large population of excited ions to cause spontaneous emissions and the power distribution of the resulting ASE is at the high level.

The noise figure of an optical amplifier affects the electrical noise of the signals transmitted through it. Inventors have therefore endeavored to make optical amplifiers with low noise figure, such as described by U.S. Pat. No. 5,138,483 by F. Flavio et. al. It is of some importance to have equipment to measure accurately the noise figure of optical amplifiers.

Three methods have been traditionally practiced for optical amplifiers characterization. These methods are:

1. The optical interpolation method using an optical spectrum analyzer is based on separate measurements of output power of an amplifier at the signal wavelength and amplified spontaneous emission (ASE) power near the signal wavelength[1]. In the optical interpolation method the assumption is done that the ASE at signal wavelength can be substituted by the average of ASE measurements at two close adjacent wavelength, usually, low and high wavelength.

2. The time domain method takes advantage of the time domain characteristic of optical amplifiers[1]. When the signal is applied to an optical amplifier, the output ASE power at the signal wavelength is the subject of interest. When the signal is tuned off, the ASE will increase to the undriven level. There is a long enough time constant in the ASE increase, so that accurate ASE measurements can be conducted within few microseconds after shutting off the source.

3. The electrical Carrier to Noise Ratio method also known as the electrical spectrum analyzer method, which consists of measuring the electrical carrier to noise ratio of a light wave modulated at high frequency and then deriving the optical noise figure from the relation:

$$NF=86+Pin+20\log (OMI)-10\log (1/(1/CNR_0-1/CNR_1))$$

where Pin is the input power to the optical amplifier, OMI is the optical modulation index defined as the ratio of peak to peak optical power to the average optical power, $CNR_0$ is the Carrier to Noise Ratio measured at a receiver without an optical amplifier and $CNR_1$ is the Carrier to Noise Ratio measured at a receiver following an optical amplifier and an attenuator to bring the power back down to Pin. The relation above is valid for typical video distribution applications with the electrical bandwidth of 6.6 Mhz[2].

All three methods in the prior art suffer from limitations as much as they necessitate the use of external light sources with low noise. The test procedure for all three methods presumes separate measurement of source characteristics for each test point, disconnecting and re-connecting the amplifier at each measurement, which adds to the overall uncertainty.

The optical methods are performed with the use of an optical opectrum analyzer. When laser sources are used, the presence of side modes in the optical spectrum can degrade the accuracy. The accurate synchronization in time domain method adds to complexity of the test procedure and/or the light source.

The electrical CNR method requires a modulator and means of accurate measurement of optical modulation index. The accuracy of the CNR method is also limited due to difficulties in calibration of the optical to electrical converter.

All of the existing prior art methods utilize expensive instruments and special test procedures.

Figure 1:
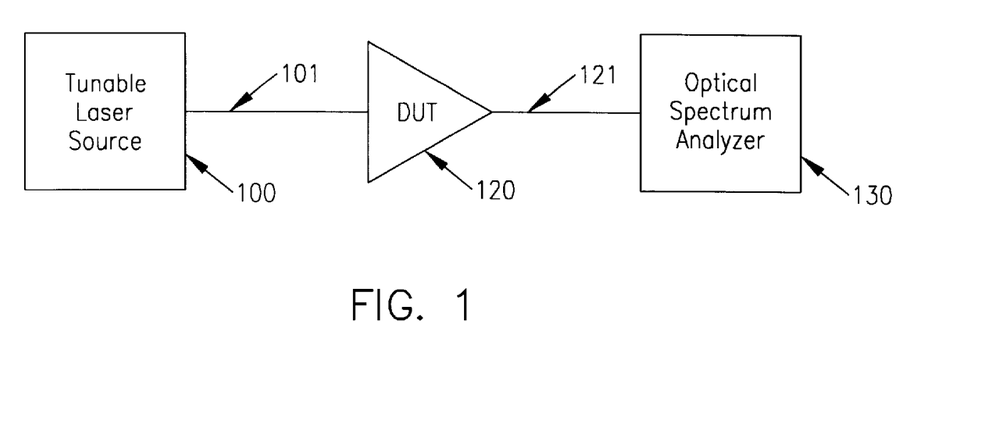
FIG. 1 shows the block diagram of the prior art method of amplifier characterization.
Figure 2:
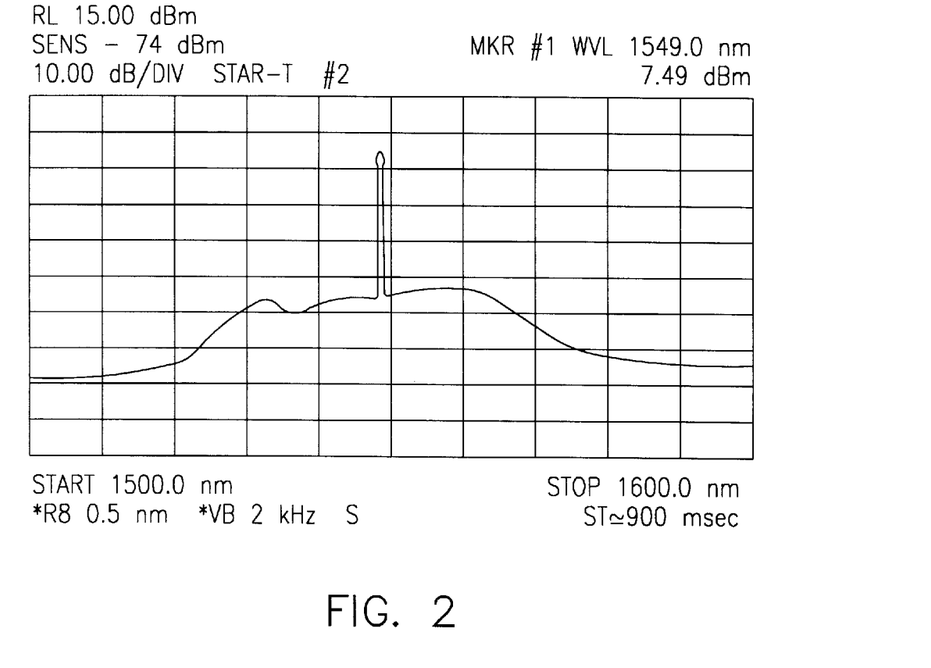
FIG. 2 shows the output power over wavelength response of the amplifier fot the prior art method.

In FIG. 1 is shown the block diagram of the optical amplifier characterization setup according to the prior art method. The setup comprises a tunable laser source 100, that provides an optical signal of known wavelength and power to the Device Under Test (DUT) i.e. the optical amplifier 120. In a first phase of the measurement, the optical spectrum analyzer 130 is connected directly to the output of tunable laser source through patch cord 101. The output signal from the source and the noise level of the source are then recorded from the display of the optical spectrum analyzer. In a second phase the output of the source is connected to the input of the optical amplifier 120 via patch cord 101 and the output of the amplifier is connected to the input of the optical spectrum analyzer via patch cord 121. The signal level and the Amplified Spontaneous Emission (ASE) power level at the signal wavelength are measured as it is shown in FIG. 2. Measurement of the amplified spontaneous emission right at the signal wavelength requires the elimination or severe attenuation of the signal power. Prior art methods usually achieve this by using a polarizer to extinguish the signal or by taking advantage of the long response time of the ASE. The source is turned off and the ASE is measured before it has had time to significantly change from its saturated value.

The typical procedure for the prior art methods therefore involves first the measurement of the tunable laser source and then introduction of the optical amplifier. The accuracy of the measurements can be significantly affected by the noise characteristics of the tunable laser source.

The necessity for a simple, accurate and reliable method and apparatus to characterize the optical amplifiers becomes more and more important as telecommunications and cable industries increase their employ of fiber optics.

BRIEF SUMMARY OF THE INVENTION

The invention aims at simplifying and increasing the accuracy of Noise Figure and output power measurements. The proposed method does not require a source and the amplifiers gain is automatically known due to a one time calibration procedure. The invention proposes to use the Optical Amplifier as the source and the Device Under Test at the same time. This is achieved by applying feedback with previously known loss to the optical amplifier which drives it into oscillation. The feedback loop consists of a coupler 140, tunable filter 150 and variable attenuator 160. The DUT 120 i.e. the optical amplifier oscillates at the wavelength desired for analysis, as defined by the tunable filter 150. The known loss in the feedback loop defines the Gain of the optical amplifier. This loss can be varied by a variable attenuator 160 thus the Gain and input—output power relations can be varied at will. Attaching a wavelength sensitive measuring instrument such as a high resolution filter 170 and optical power meter 180 to the other arm of the coupler 140, we get all the necessary data for characterizing the amplifier.

DETAILED DESCRIPTION OF THE PREFERRED EMBODIMENTS

Figure 3:
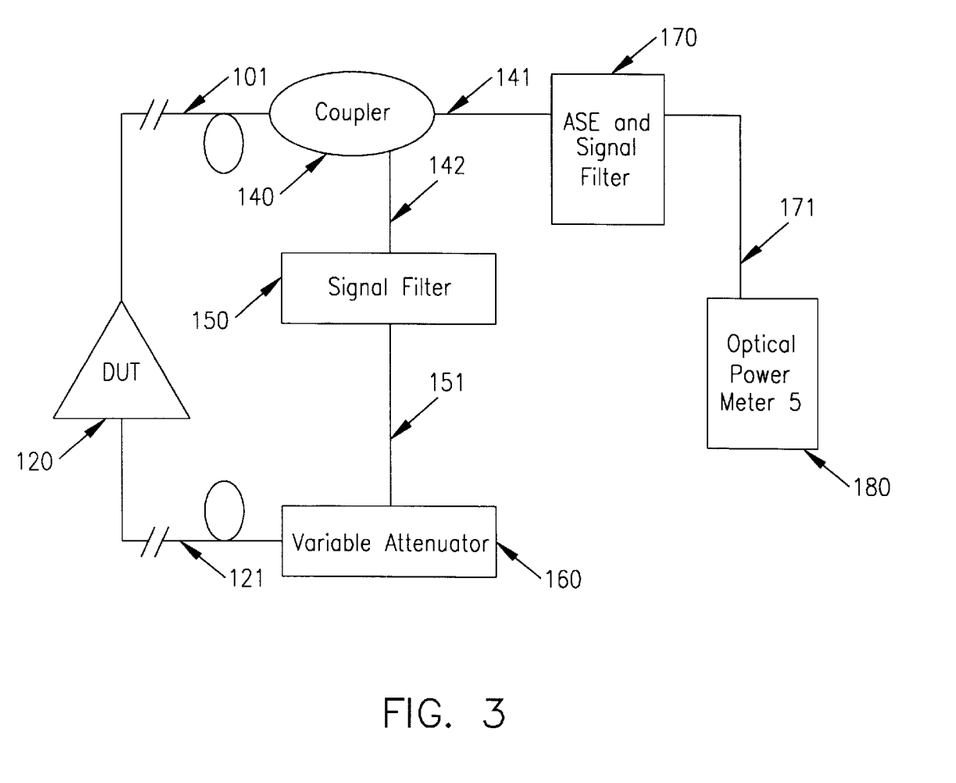
FIG. 3 shows the block diagram in accordance with the invention.

To simplify the prior art method, speed up the measurements and improve the accuracy by eliminating the tunable laser source 100, the invention presumes to drive the optical amplifier into oscillation mode according to the setup of FIG. 3.

The 1 to 2 coupler 140 splits the output of the DUT i.e. optical amplifier to branches. Branch 1 consists of signal filter 150 followed by the variable attenuator 160. They are connected with patch cords 142 and 151 respectively. The other side of the variable attenuator is connected to the input of the DUT 2 through patch cord 121 thus closing the feedback loop. By setting the variable attenuator the optical amplifier can be driven into lasing.

Figure 4:
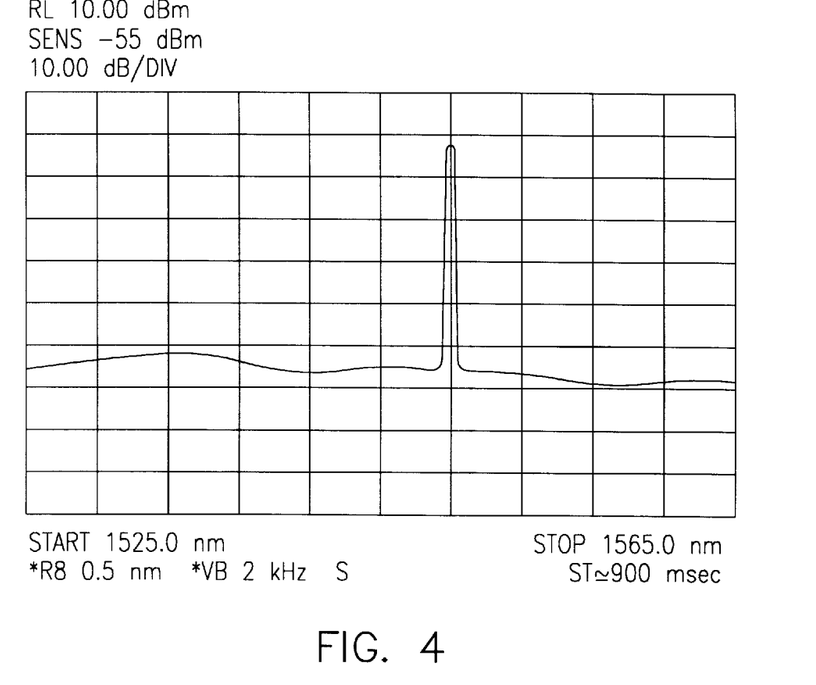
FIG. 4 shows the output power over wavelength response of the amplifier for the proposed method.

The output of the lasing amplifier as it is observed on the optical spectrum analyzer, is shown in FIG. 4. The Signal and ASE curve is similar to one shown on FIG. 2.

Branch 2 of the invention presented on FIG. 3, consists of the signal-ASE filter 170 and the optical power meter 180 connected through the patch cords 141 and 171. Three measurements are necessary to implement the proposed method. First, the signal-ASE filter 170 is tuned to the same wavelength as the signal filter 150 in branch 1. The power of oscillations is measured by the optical power meter. Then the signal-ASE filter 170 is tuned to the low and high sides of the signal wavelength (about 1 nm spacing) and the ASE powers are measured.

Figure 5:
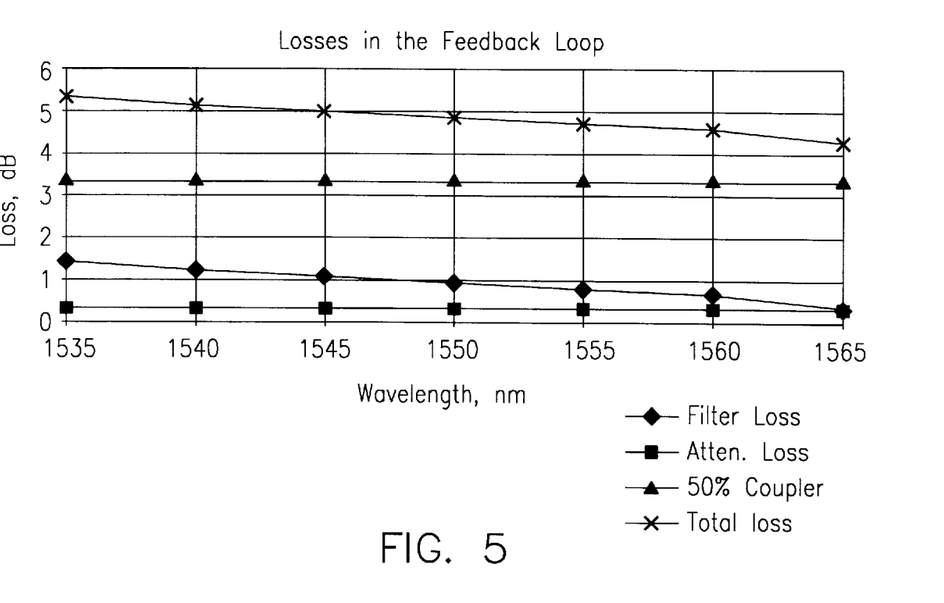
FIG. 5 shows the feedback loop transfer function and its components.

The invention was implemented with a 50% 1 to 2 Coupler characterized by a transfer function presented in FIG. 5. The Gain of the amplifier in this setup was defined by the feedback loop that consists of the above described objects 140, 150 and 160 and respective patch cords 101, 142, 151 and 121 and was clamped to the known value, defined by the feedback loop transfer function L at each wavelength.

When the 1 to 2 Coupler is characterized, the actual Signal and ASE powers at the output of the amplifier can be calculated from the measured values at the optical power meter 180 by using equation 1. The Noise Figure is then calculated according to the formula:

$$NF = \frac{\text{Pase}}{h \cdot v \cdot B \cdot \text{Gain}} + \frac{1}{\text{Gain}} \quad \text{Equation 1}$$

$$\text{Pase} = (\text{Pase}-\text{low} + \text{Pase}-\text{high})/2$$

where Pase-low is the ASE power at the low wavelength side of the signal, and Pase-high is the ASE power at the high side of the signal wavelength, measured in the filter bandwidth B and h is Plank's constant, v is the light frequency and Gain=L, L is the feedback loop transfer function.

Figure 6:
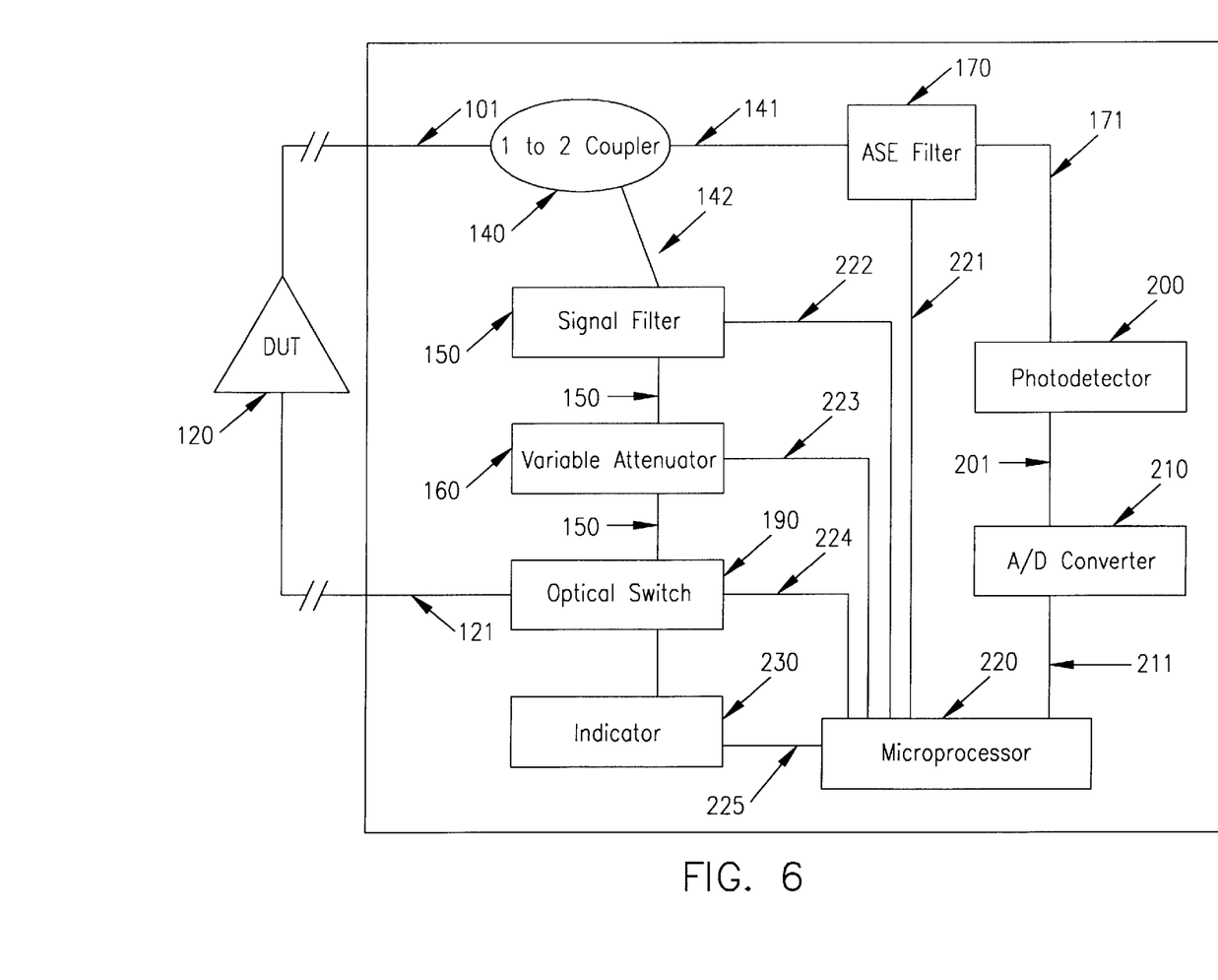
FIG. 6 shows a preferred embodiment apparatus to implement the invention.

Another preferred embodiment of the invention is shown on FIG. 6. As on block diagram of FIG. 3, the output of the amplifier through the 1 to 2 coupler 140 is split into two branches: the feedback loop and the measurement branch. The signal filter 150 defines the wavelength, the variable attenuator 160 defines the Gain and accordingly, the input power. The optical switch 190 is used to implement the shutting off the signal so that the ASE level at the wavelength could be accurately determined. The signal-ASE filter 170 defines the Signal or ASE wavelength of measurements. The photodetector 200 and the Analog to Digital converter 210 transforms the output signal into the code for processing by microprocessor 220. The microprocessor controls the settings of the signal wavelength at signal filter, the signal or ASE measurements wavelength at signal-ASE filter, and the Gain at variable attenuator. Microprocessor stores the results of measurements and performs the calculations according to equation 1. The results such as Gain, Input and Output Power and Noise Figure are displayed on the indicator 230 together with wavelength settings. The microprocessor has an option of transferring the data to the external computer. The optical connections are provided via the fiber patch cords 101, 121, 141, 142, 151, 161, 171 and 201. Electrical connections for microprocessor controls are provided via the cables 221, 222, 223, 224 and 225.

For the needs of implementing the time domain approach to the ASE measurements, the microprocessor also controls the optical switch 190.

Figure 7:
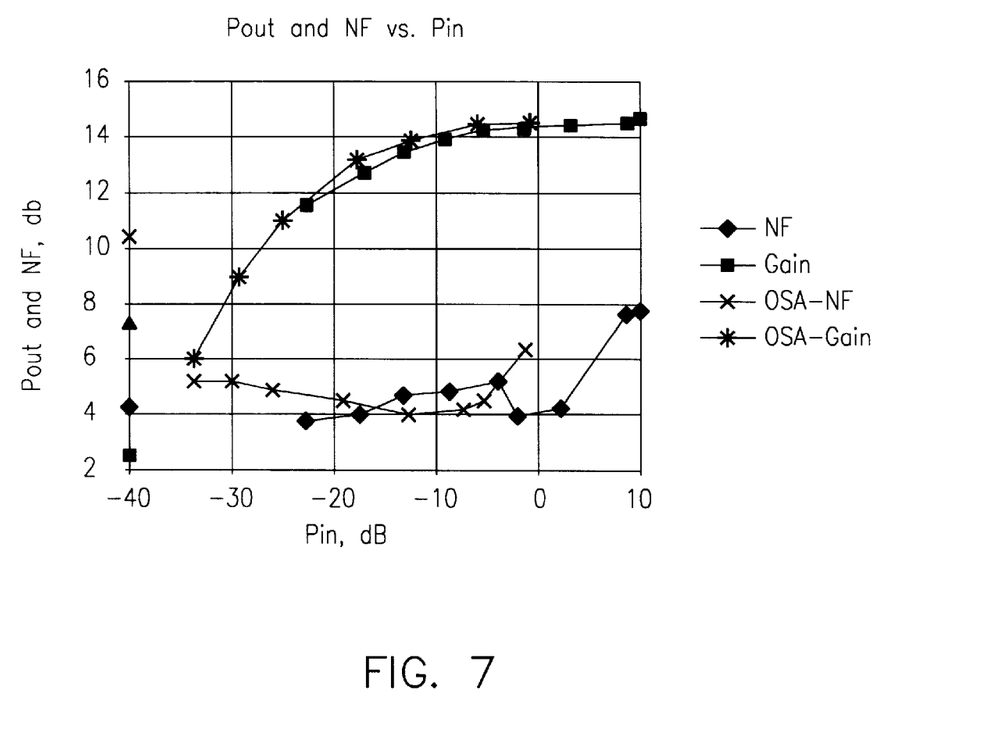
FIG. 7 shows the results of NF and output power measurements with the preferred embodiment and prior art method.

The microprocessor implements the 10 step procedure:
1. set the signal filter to the wavelength under interest according to prior known signal filter tuning curve
2. set the variable attenuator to provide the gain under interest according to prior known feedback loop transfer function
3. set the signal-ASE filter to the wavelength under interest
4. get the signal power level from photodetector and A/D converter
5. set the signal-ASE to the low wavelength with the spacing defined externally (the spacing depends on the signal-ASE filter's wavelength response).
6. get the ASE power at the low wavelength
7. set the signal-ASE to the high wavelength with the spacing defined externally (the spacing depends on the signal-ASE filter's wavelength response).
8. get the ASE power at the high wavelength
9. perform the output power, input power and NF calculations according to equation 1.
10. return to 1 or 2 on operator's discretion The results of measurements utilizing the preferred embodiment of FIG. 5 are shown in FIG. 7. A comparison with the prior art interpolation method is provided.

Figure 8:
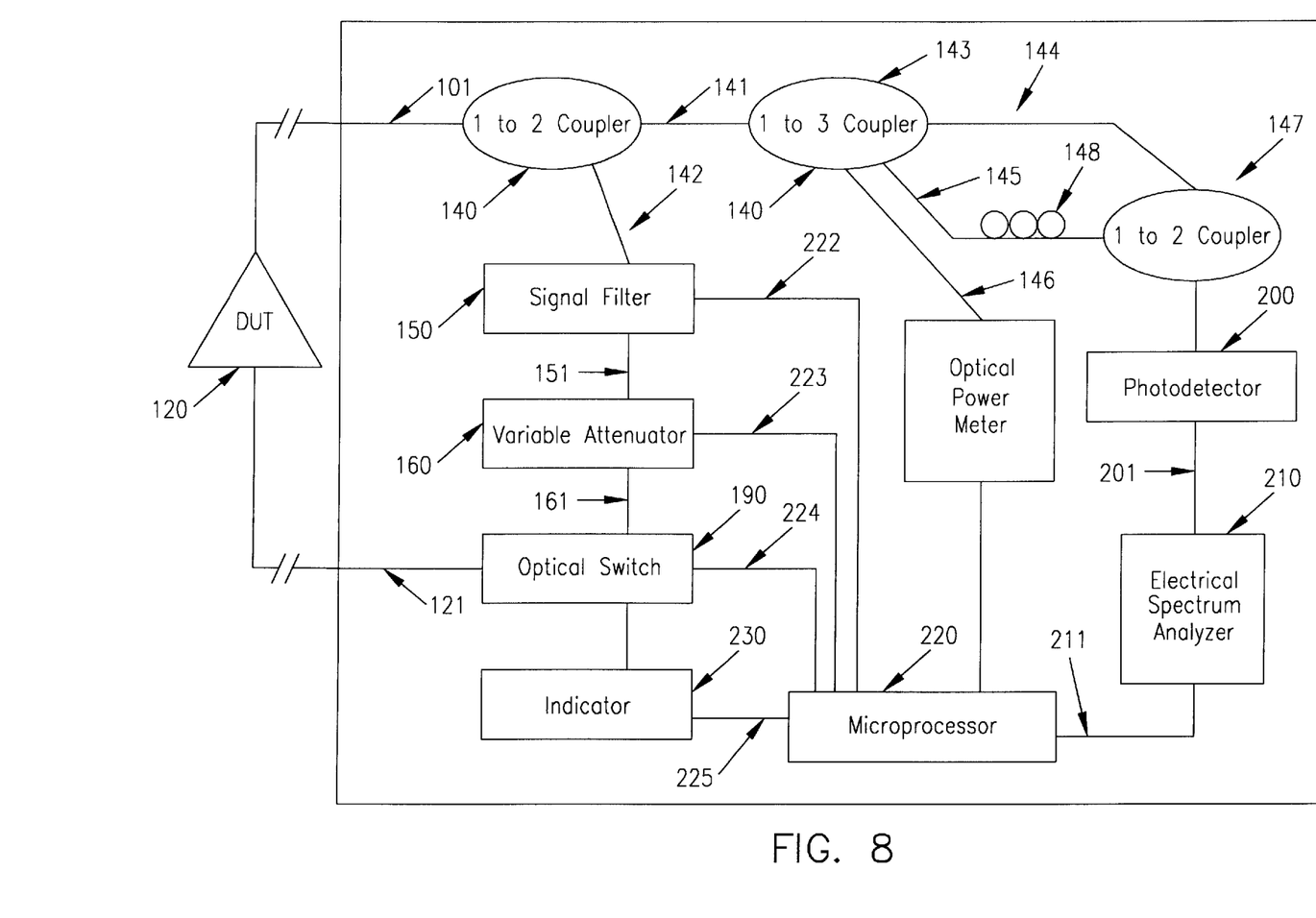
FIG. 8 shows the preferred embodiment of the invention for lasing bandwidth measurements.

Another preferred embodiment is shown in FIG. 8. and utilizes the well known self heterodyne method of laser line width measurement to obtain a measure of the noise figure. This embodiment differs from the first embodiment inasmuch as it replaces the ASE power measurement by a laser line width measurement (FIG. 7). The second arm of the 1 to 2 coupler 140 is connected through the fiber patch cord 142 to the 1 to 3 coupler 143. One of the outputs of the coupler 143 is connected to an optical power meter 180. The output power of the 1 to 3 coupler 143 is measured by the optical power meter 180 and then recalculated to the output of the amplifier using the known characteristics of the 1 to 2 coupler 140 and the 1 to 3 coupler 143. The first output of the 1 to 3 coupler 143 is connected to the first input of the 1 to 2 coupler 147 through the over 1,000 meters long fiber link 144, and the second output of the coupler 143 is connected via the fiber patch cord 145 and polarization controller 148 to the second input of the coupler 147 so as to form an interferometer. This setup is described in the literature[4] as the self-heterodyne line width measurement. The output of the 1 to 2 coupler 147 is then the sum of two light signals, one with significant delay relative to the second. Because of the delay the signals are non-coherent. This output through the fiber 171 arrives at the photodetector 200. The electrical signal produced by the photodetector is analyzed by the electrical spectrum analyzer 210. The spectral width of the resulting signal is a function of the noise characteristic of the lasing optical amplifier. The Noise Figure of the optical amplifier can be then derived from the Shawlow—Townes relation[3] (equation 2):

$$\Delta v = \pi (\Delta v^\circ)^2 v NF/(2P) \qquad \text{Equation 2}$$

where $\Delta v$ is the spectral width of the lasing optical amplifier as it is measured by electrical spectrum analyzer 210, $\Delta v^\circ$ is the spectral width of the non-lasing (cold) optical amplifier defined by the feedback loop transfer function L: $\Delta v^\circ = v/L$, P is the lasing optical power, v is the lasing frequency, h is the Plank's constant.

The electrical spectrum analyzer 210 through the electrical cable 211 is connected to the microprocessor 220, which performs the necessary control and calculation tasks.

References

1. J. Stipple, D. Bailey: EDFA Testing—Getting the Most From Your Test Equipment, in 1995 US Lightwave Symposium, p.p. 60–75, Hewlett-Packard, 1995.
2. I. Habbab, L. J. Cimini, Optimized Performance of Erbium Doped Fiber Amplifiers in Subcarrier Multiplexed Lightwave AM-VSB Systems. Journal of Lightwave Technology. V.9, No. 10, p.p. 1321–1329, 1991
3. A. Yariv, "Optical Electronics", Saunders College pub., p. 375 (1991)
4. A. Yariv, "Optical Electronics", Saunders College pub., p. 389 (1991).

What is claimed is:

1. An apparatus for the measurement of optical amplifier noise figure and gain comprising:

means for coupling a known part of the output power of an amplifier under test to a wavelength filtering means and the remaining part of said output power to lasing power elimination means, means for controlling the attenuation of light in a fiber to a known value, means for measuring optical power by converting the optical power to an electrical signal, and means for converting said electrical signal to a digital representation for further processing, wherein the output of the amplifier under test is made to enter said coupling means and the first output of said coupling means is directed into the wavelength filtering means, the output of said wavelength filtering means is directed into said attenuation means, the output of said attenuation means is directed back into the input of said optical amplifier under test, and the second output of said coupling means is directed into said lasing power elimination means and the output of the lasing power elimination means is directed into said means for converting the optical power into an electrical signal.

2. The apparatus of claim 1 wherein the wavelength filtering means is a tunable multilayer dielectric filter.

3. The apparatus of claim 1 wherein the coupling means is a variable coupling ratio fiber coupler.

4. The apparatus of claim 1 wherein the lasing power elimination means is a tunable multilayer dielectric filter.

5. The apparatus of claim 1 wherein the lasing power elimination means is a polarizer.

6. The apparatus of claim 1 wherein the wavelength filtering means is a tunable grating spectrometer filter.

7. The method of directing the output power of an optical amplifier back into the input of said optical amplifier via means for filtering out a specific range of wavelengths and means for introducing a known power attenuation, for the purpose of measuring the gain and noise figure of said optical amplifier, said method incorporating the steps of first measuring the attenuation of the filtering means at the wavelengths of interest, followed by measuring the attenuation of the attenuating means at the wavelengths of interest, followed by measuring the output power of the amplifier at the wavelength of interest followed by measuring the amplified spontaneous emission of the amplifier at a first wavelength adjacent to the wavelength of the output power measurement and larger than the wavelength of the output power, followed by a measurement of the amplified spontaneous emission at a wavelength lower than the wavelength of the output power.

8. The method of claim 7 wherein the measurement of the amplified spontaneous emission is achieved by eliminating the amplifier output power by use of a second wavelength filtering means.

9. An apparatus for the measurement of optical amplifier noise figure and gain comprising:

means for coupling a known part of the output power of an amplifier under test to a wavelength filtering means and the remaining part of said output power to a lasing power elimination means, means for controlling the attenuation of light in a fiber to a known value, means for blocking or switching the light, means for measuring optical power by converting the optical power to an electrical signal, and means for converting said electrical signal to a digital representation for further processing, wherein the output of the amplifier under test is made to enter said coupling means and the first output of said coupling means is directed into the wavelength filtering means, the output of said wavelength filtering means is directed into said attenuation means, the output of said attenuation means is directed into said means for switching the light and then the output of said means for switching the light directed back into the input of said optical amplifier under test, and the second output of the said coupling means is directed into said lasing power elimination means and the output of said lasing power elimination means is directed into said means for converting the optical power into an electrical signal.

10. The method of using the apparatus in claim 9 to measure noise figure of amplifiers, wherein the measurement of the amplified spontaneous emission is achieved by eliminating the output power of the optical amplifier by temporally blocking or switching off the optical input to said amplifier by means of said optical switch interposed between said attenuation means and said input to the amplifier.

11. An apparatus for the measurement of optical amplifier noise figure and gain comprising:

first coupling means for coupling a known part of the output power of the amplifier under test to a wavelength filtering means and the remaining part of said output power to a second coupling means, means for controlling the attenuation of light in a fiber to a known value, the second coupling means being for coupling part of the output of the first coupling means into a first optical fiber and the remaining part of the output of the first coupling means to a second optical fiber of length larger than 1 kilometer, third coupling means for recombining the outputs of said first fiber and said second fiber, means for controlling the polarization of the light in the first fiber, means for converting optical power to a high bandwidth electrical signal, means for measuring the electrical bandwidth of an electrical signal, wherein the output of the amplifier under test is made to enter said first coupling means and the first output of said first coupling means is directed into the wavelength filtering means, the output of said first filtering means is directed into said attenuation means, the output of said attenuation means is directed back into the input of said optical amplifier under test, and the second output of said first coupling means is directed into said second coupling means, and further the first output of the second coupling means is directed into said first fiber and the second output of said second coupling means into said second fiber then the outputs of both said fibers are recombined through said third coupling means for the purpose of mixing both said fiber outputs onto said means for converting optical power to a high bandwidth electrical signal and then directing the electrical output of the photodetector into said means for measuring the electrical bandwidth of an electrical signal.

12. The apparatus of claim 11, wherein said means for converting optical power to a high bandwidth electrical signal comprises a photodetector.

13. The apparatus of claim 11, wherein said means for measuring the electrical bandwidth of an electrical signal comprises a spectrum analyzer.

* * * * *